(12) United States Patent
Kurtz, Jr. et al.

(10) Patent No.: US 6,996,880 B2
(45) Date of Patent: Feb. 14, 2006

(54) FASTENER ELEMENTS AND METHODS OF MANUFACTURE

(75) Inventors: Wallace L. Kurtz, Jr., Lunenburg, MA (US); Brian J. VanBenschoten, Rochester, NH (US); Ernesto S. Tachauer, Bedford, NH (US); Michel Labrecque, Manchester, NH (US); Clinton Dowd, Goffstown, NH (US)

(73) Assignee: Velcro Industries B.V., Curacao (NL)

( * ) Notice: Subject to any disclaimer, the term of this patent is extended or adjusted under 35 U.S.C. 154(b) by 0 days.

(21) Appl. No.: 10/404,867

(22) Filed: Apr. 1, 2003

(65) Prior Publication Data

US 2004/0194262 A1 Oct. 7, 2004

(51) Int. Cl.
*A44B 18/00* (2006.01)

(52) U.S. Cl. .................... 24/446; 24/449; 24/450; 24/452

(58) Field of Classification Search .............. 24/449, 24/452, 446, 450; 428/100
See application file for complete search history.

(56) References Cited

U.S. PATENT DOCUMENTS

| | | |
|---|---|---|
| 3,494,006 A | 2/1970 | Brumlik |
| 3,522,637 A | 8/1970 | Brumlik |
| 3,889,322 A | 6/1975 | Brumlik |
| 4,001,366 A | 1/1977 | Brumlik |
| 4,198,734 A | 4/1980 | Brumlik |
| 4,541,154 A | 9/1985 | Ito et al. |
| 4,794,028 A | 12/1988 | Fischer |
| 4,894,060 A | 1/1990 | Nestegard |
| 5,131,119 A | 7/1992 | Murasaki et al. |
| 5,231,738 A | 8/1993 | Higashinaka |
| 5,315,740 A | 5/1994 | Provost |
| 5,369,852 A | 12/1994 | Higashinaka |
| 5,396,687 A | 3/1995 | Osterman |
| 5,505,747 A | 4/1996 | Chesley et al. |
| 5,515,583 A | 5/1996 | Higashinaka |
| 5,537,720 A | 7/1996 | Takizawa et al. |
| 5,551,130 A | 9/1996 | Tominaga et al. |
| D374,813 S | 10/1996 | Akeno |
| 5,625,930 A | 5/1997 | Takizawa et al. |
| 5,657,517 A | 8/1997 | Akeno et al. |
| 5,685,050 A | 11/1997 | Murasaki |
| 5,715,581 A | 2/1998 | Akeno |
| 5,860,194 A | 1/1999 | Takizawa et al. |
| 5,953,797 A | 9/1999 | Provost et al. |
| 5,979,024 A | 11/1999 | Renwick |

(Continued)

FOREIGN PATENT DOCUMENTS

EP 0 324 577 7/1989

(Continued)

*Primary Examiner*—James R. Brittain
(74) *Attorney, Agent, or Firm*—Fish & Richardson P.C.

(57) ABSTRACT

A male fastener element extends integrally from a planar base and includes a primary engagement hook and a secondary engagement structure (e.g., a hook). The primary engagement hook has a stem portion that is integrally molded with the planar base and that extends from the planar base to a distal end. The primary engagement hook also has an overhang portion that extends from the distal end of the stem portion and that has an underside surface overhanging an open volume for receiving loops. The secondary engagement structure, which is shorter than the primary engagement hook, is disposed immediately adjacent the primary engagement hook and extends from a side surface of the primary engagement hook. The secondary engagement structure extends from the base to a distal end that is disposed, in side view, below the surface of the overhang portion of the primary engagement hook.

12 Claims, 15 Drawing Sheets

U.S. PATENT DOCUMENTS

| | | |
|---|---|---|
| 5,985,406 A | 11/1999 | Takizawa et al. |
| 6,061,881 A | 5/2000 | Takizawa et al. |
| 6,063,067 A | 5/2000 | Takizawa et al. |
| RE36,779 E | 7/2000 | Takizawa et al. |
| 6,174,476 B1 | 1/2001 | Kennedy et al. |
| 6,248,276 B1 | 6/2001 | Parellada et al. |
| 6,367,128 B1 | 4/2002 | Galkiewicz et al. |
| 2002/0022108 A1 | 2/2002 | Krantz et al. |

FOREIGN PATENT DOCUMENTS

| | | |
|---|---|---|
| EP | 0985361 | 3/2000 |
| EP | 1 190 636 | 3/2002 |
| WO | WO 99/22626 | 5/1999 |

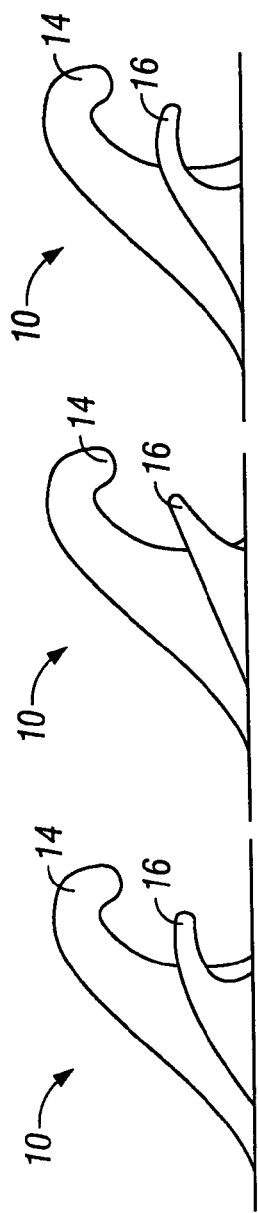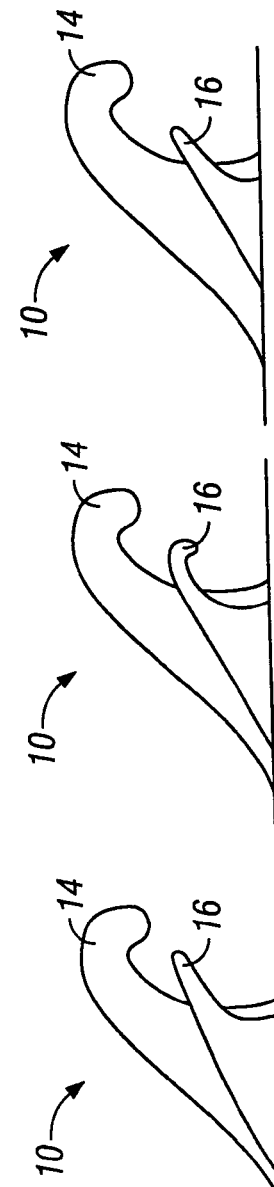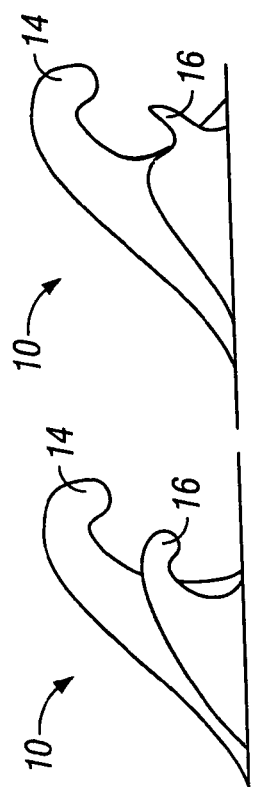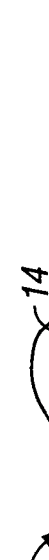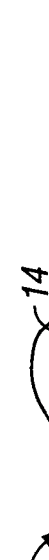

FASTENER ELEMENTS AND METHODS OF MANUFACTURE

TECHNICAL FIELD

This invention relates to fastener elements useful for engaging loops and the like.

BACKGROUND

Touch fasteners, such as hook and loop fasteners, generally include a male fastener component that includes a plurality of male fastener elements, and a cooperating female fastener component. In general, the male fastener elements are adapted to engage loops or anchored fibers on the female fastener component. Male fastener elements can be molded directly into a desired shape or, alternatively, can be molded first and then formed into a desired shape. Molded male fastener elements typically are integrally formed with the base.

Some male fastener elements are in the shape of hooks. Each hook includes a stem extending from the base to a head with a crook which overhangs the base. Typically, the hooks are molded in a continuous process, using a mold roll formed of a series of stacked plates, e.g., as described in Fischer, U.S. Pat. No. 4,794,028, the disclosure of which is incorporated herein by reference.

SUMMARY

In one aspect, the invention features a male fastener element extending integrally from a planar base. The fastener element includes a primary engagement hook having a stem portion integrally molded with and extending from the planar base to a distal end, and an overhang portion extending from the distal end of the stem portion and having an underside surface overhanging an open volume for receiving loops. The fastener element also includes a secondary engagement structure disposed immediately adjacent the primary engagement hook and extending from a side surface thereof. The secondary engagement structure is shorter than the primary engagement hook and extends from the base to a distal end disposed, in side view, below the underside surface of the overhang portion of the primary engagement hook.

The primary engagement hook preferably has a height of between about 0.005 inch and about 0.250 inch. The secondary engagement structure preferably has a height of between about 0.003 inch and about 0.248 inch. In some embodiments, the secondary engagement structure has a height that is between about 1% and about 99% (e.g., between about 20% and about 80%) the height of the primary engagement hook.

The primary engagement hook preferably has a thickness of less than about 0.030 inch. The secondary engagement structure preferably has a thickness of less than about 0.050 inch. In some cases, the secondary engagement structure has a thickness that is between about 2% and about fifty times (e.g., between about 15% and about 8 times) the thickness of the primary engagement hook.

In some embodiments, a lowest part of the distal end of the primary engagement hook and a highest part of the secondary engagement structure define between them a gap of a size selected to receive an engageable fiber of a mated loop material. The distance between the lowest part of the distal end of the primary engagement hook and the highest part of the secondary engagement structure is preferably at least about 0.001 inch (e.g., between about 0.001 inch and about 0.248 inch).

The male fastener element can be formed of a polymeric material, for example. In some embodiments, the male fastener element is of a thermoplastic resin. The male fastener element preferably is molded of a resin from the following group: polyurethanes, polyolefins, polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers.

In some embodiments, the secondary engagement structure has a hook. The secondary engagement structure can include a palm-tree hook, for example.

In some cases, the secondary engagement structure forms a diverter (e.g., a wedge-shaped structure), such as for diverting loops for improved engagement.

In some cases, the secondary engagement structure defines a notch that can be useful for engaging a loop for better retention.

In some embodiments, the secondary engagement structure includes a knob.

In some cases, the primary engagement hook includes a palm-tree hook. The primary engagement hook can also be mushroom-shaped.

In some cases, the distal end of the secondary projection points toward the planar base. In some other cases, the distal end of the secondary projection points away from the planar base.

Preferably, the entire secondary engagement structure is disposed, in side view, beneath the overhang portion of the primary engagement hook. It is also desirable, for some applications, that the secondary engagement structure projects, in side view, outward beyond the overhang portion of the primary engagement hook.

In another aspect, the invention features a male fastener element extending integrally from a planar base. The fastener element includes a primary engagement hook that has a stem portion integrally molded with and extending from the planar base to a distal end, and an overhang portion extending from the distal end of the stem portion and having an underside surface overhanging an open volume for receiving loops. The fastener element also includes a secondary engagement structure disposed laterally adjacent the primary engagement hook. The primary engagement hook and the secondary engagement structure define a lateral separation between them of between about 0.0005 inch and about 0.004 inch. The secondary engagement structure is shorter than the primary engagement hook and extends from the base to a distal end disposed, in side view, below the underside surface of the overhang portion of the primary engagement hook.

In another aspect, the invention features a male fastener element extending integrally from a planar base. The fastener element includes a molded, tapered primary stem extending integrally from the planar base to a distal end. The fastener element also includes a secondary engagement structure having a tapered stem portion integrally molded with the tapered primary stem and extending from the planar base to a distal end, and a tapered overhang portion extending from the distal end of the stem portion and having a first underside surface overhanging a first open volume for receiving loops. The fastener element further includes a second overhang portion disposed at the distal end of the primary stem. The second overhang portion has a second underside surface overhanging a second open volume for engaging loops. The second overhang portion extends, in side view, above the overhang portion of the secondary engagement structure. The overhang portions of the secondary engagement structure and the primary stem together overhang at most a single, contiguous area of the base.

In another aspect, the invention features a method of making a male fastener element extending from a planar base. The method includes molding a tapered primary stem extending integrally from the planar base to a distal end. The method also includes molding a secondary engagement structure including a tapered stem portion integrally molded with the tapered primary stem and extending from the planar base to a distal end, and a tapered overhang portion extending from the distal end of the stem portion and having a first underside surface overhanging a first open volume for receiving loops. The method further includes forming a second overhang portion disposed at the distal end of the primary stem and having a second underside surface overhanging a second open volume for engaging loops, the second overhang portion extending, in side view, above the overhang portion of the secondary engagement structure. The overhang portions of the secondary engagement structure and the primary stem together overhang at most a single, contiguous area of the base.

In some embodiments, the primary stem portion and the secondary engagement structure are both molded simultaneously in a contiguous cavity.

In some cases, the overhang portion forming step includes first heating and then cooling the distal end of the primary stem portion.

The planar base is also laminated to another material for some applications.

In another aspect, the invention features a method of making a male fastener element extending from a planar base. The method includes integrally molding a primary stem portion extending from the planar base and terminating in a distal end, forming a secondary engagement structure, and forming an overhang portion extending from the distal end of the primary stem portion and having an underside surface overhanging an open volume for receiving loops. The secondary engagement structure is disposed immediately adjacent the primary stem portion and extends from a side surface thereof. The secondary engagement structure is shorter than the primary stem portion and extends from the base to a distal end disposed, in side view, below the underside surface of the overhang portion.

In some embodiments, the molding step includes extruding a resin into a gap defined against a surface of a rotating mold roll, where the mold roll has discrete cavities extending inward from the surface.

In some cases, the secondary engagement structure forming step includes molding. The primary stem portion and the secondary engagement structure can be molded simultaneously in a contiguous cavity.

The overhang portion forming step in some embodiments includes first heating and then cooling the distal end of the primary stem portion.

In another aspect, the invention features a molded male fastener element extending integrally from a planar base. The fastener element includes a primary engagement hook having a tapered stem portion integrally molded with and extending from the base to a distal end. A tapered overhang portion extends from the distal end of the stem portion and has an underside surface overhanging the base for engaging loops. The fastener element also includes a secondary projection extending integrally outward from the stem portion of the primary engagement hook. The secondary projection is shorter than the primary engagement hook in a direction that is perpendicular to the base. The secondary projection extends, in side view, below an underside surface of the overhang portion of the primary engagement hook.

The primary engagement hook preferably has a height of less than about 0.250 inch. In some embodiments, the secondary projection extends outward from the stem portion of the primary engagement hook at a height, relative to the planar base, of between about 1% and about 99% the height, relative to the planar base, of the primary engagement hook.

In some embodiments, the male fastener element is formed of a polymeric material. In some cases, the male fastener element is of a thermoplastic resin. The male fastener element preferably is formed of a resin from the following group: polyurethanes, polyolefins, polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers.

The secondary projection can include a hook. In some cases, the secondary projection extends outward from the stem portion of the primary engagement hook in the direction of the planar base. In other cases cases, the secondary projection extends outward from the stem portion of the primary engagement hook in a direction away from the planar base.

In another aspect, the invention features a method of making a male fastener element extending from a planar base. The method includes molding a primary engagement hook having a tapered stem portion integrally molded with and extending from the base to a distal end. A tapered overhang portion extends from the distal end of the stem portion and has an underside surface overhanging the base for engaging loops. The method also includes molding a secondary projection extending integrally outward from the stem portion of the primary engagement hook. The secondary projection is shorter than the primary engagement hook and extends, in side view, below an underside surface of the overhang portion of the primary engagement hook.

In some embodiments, the molding steps include extruding a resin into a gap defined against a surface of a rotating mold roll. The mold roll defines discrete cavities that extend inward from its surface.

Other aspects of the invention feature the above-described male fastener elements engaged with, e.g., non-wovens, wovens, or knits. Further aspects of the invention feature the above-described male fastener elements secured to articles such as diapers or other absorbent articles, or medical, automotive, or industrial articles.

Implementations of the invention may have one or more of the following advantages. The male fastener elements may exhibit good engagement properties. The male fastener elements may have more opportunities to engage a greater number of loops, relative to male fastener elements having only one engagement portion. An array of the male fastener elements may engage loops having different lengths. When the male fastener elements are loaded in the cross-machine direction (e.g., when the male fastener elements are subjected to a shear force in the cross-machine direction), they may exhibit good resistance to bending. Once they have engaged loops, the male fastener elements may remain in engagement with those loops for a relatively long period of time.

The details of one or more embodiments of the invention are set forth in the accompanying drawings and the description below. Other features and advantages of the invention will be apparent from the description and drawings, and from the claims.

DESCRIPTION OF DRAWINGS

FIGS. 8–8G are side views of embodiments of male fastener elements.

DETAILED DESCRIPTION

Figure 1:
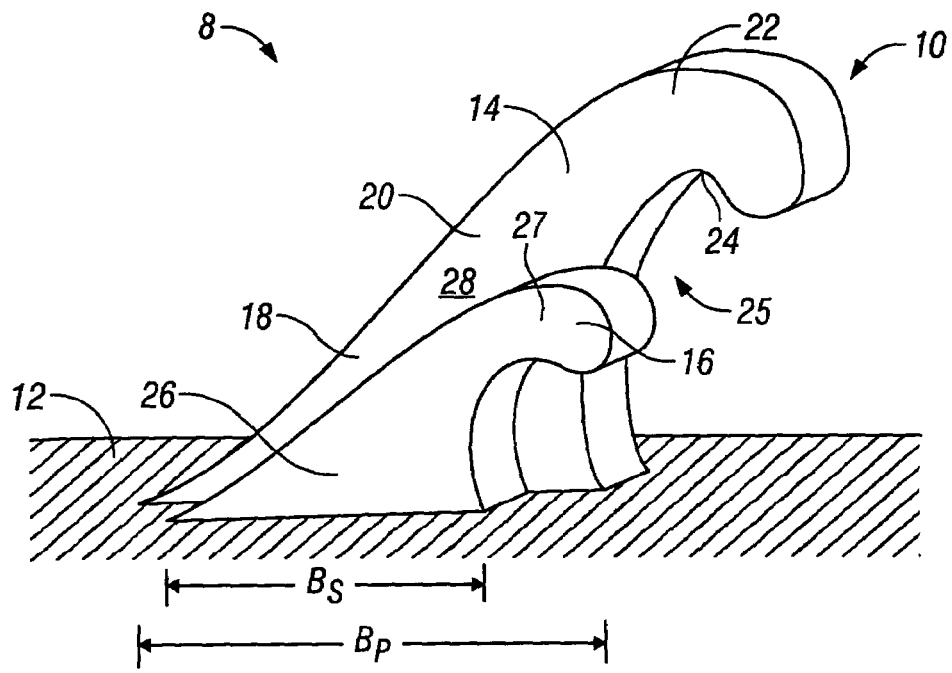
FIG. 1 is a perspective view of one embodiment of a male fastener element.

Referring to FIG. 1, a male fastener component 8 includes a male fastener element 10 which extends integrally from a planar base sheet 12. Although FIG. 1 shows just one male fastener element, an array of male fastener elements extending from a planar base may be used. Male fastener element 10 includes a primary engagement hook 14 and a secondary engagement structure 16. Primary engagement hook 14 has a stem portion 18 that is integrally molded with sheet 12. Stem portion 18 extends from sheet 12 to a distal end 20. Primary engagement hook 14 also has an overhang portion 22 that extends from distal end 20 and that has an underside surface 24 overhanging an open volume 25. The overhang portion 22 can receive loops, as will be discussed below.

Secondary engagement structure 16 also extends integrally from planar base sheet 12, and has a stem portion 26. In FIG. 1, the secondary engagement structure 16 is located immediately adjacent primary engagement hook 14, extending from a side surface 28 of the primary engagement hook. However, in other embodiments of male fastener element 10 (not shown), primary engagement hook 14 and secondary engagement structure 16 are not immediately adjacent. Rather, they are separated by a space of between about 0.0005 inch and about 0.004 inch.

Figure 1A:
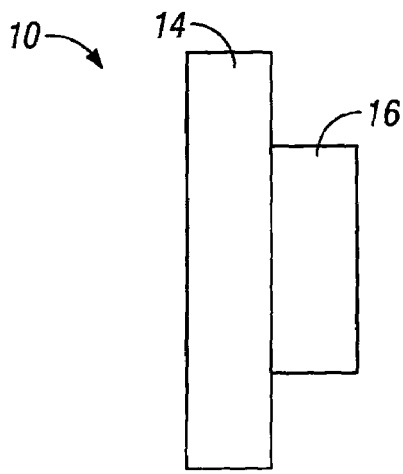
FIG. 1A is a top view of the male fastener element of FIG. 1.

At its distal end, secondary engagement structure 16 has a head portion 27. Although secondary engagement structure 16 is shown here as a hook, it can have other shapes in other embodiments of male fastener element 10. FIG. 1A, a top view of male fastener element 10, shows that primary engagement hook 14 and secondary engagement structure 16 share a common surface—i.e., that they are adjacent.

Referring back to FIG. 1, secondary engagement structure 16 is shorter than primary engagement hook 14. In other words, the secondary engagement structure is shorter than the primary engagement hook in a direction that is perpendicular to the base. In all embodiments, the secondary engagement structure is shorter than the primary engagement hook. Additionally, in FIG. 1C, the length ($L_S$) of the secondary engagement structure 16, i.e., the distance from the rear edge 15 of the base of the secondary engagement structure 16 to the most forward point 17 of its distal end, is less than the length ($L_P$) of primary engagement hook 14 (measured in the same manner). When male fastener element 10 is viewed from the side, the secondary engagement structure appears to extend below the underside surface 24 of the primary engagement hook. Secondary engagement structure 16 can also receive loops, as will be shown below. Because of the ability of structure 16 to receive loops, the overall engagement effectiveness of male fastener element 10 is generally enhanced relative to a similar male fastener element with only one engagement portion.

Figure 1B:
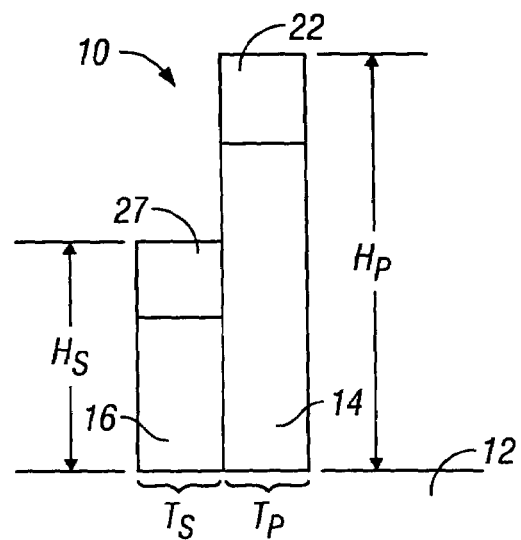
FIG. 1B is a front view of the male fastener element of FIGS. 1 and 1A.

Referring now to FIG. 1B, a front view of male fastener element 10 is shown. As mentioned above, primary engagement hook 14 is taller than secondary engagement structure 16. The primary engagement hook preferably has a height $H_P$ of between about 0.005 inch and about 0.250 inch. The secondary engagement structure preferably has a height $H_S$ of between about 0.003 inch and about 0.248 inch.

Figure 1C:
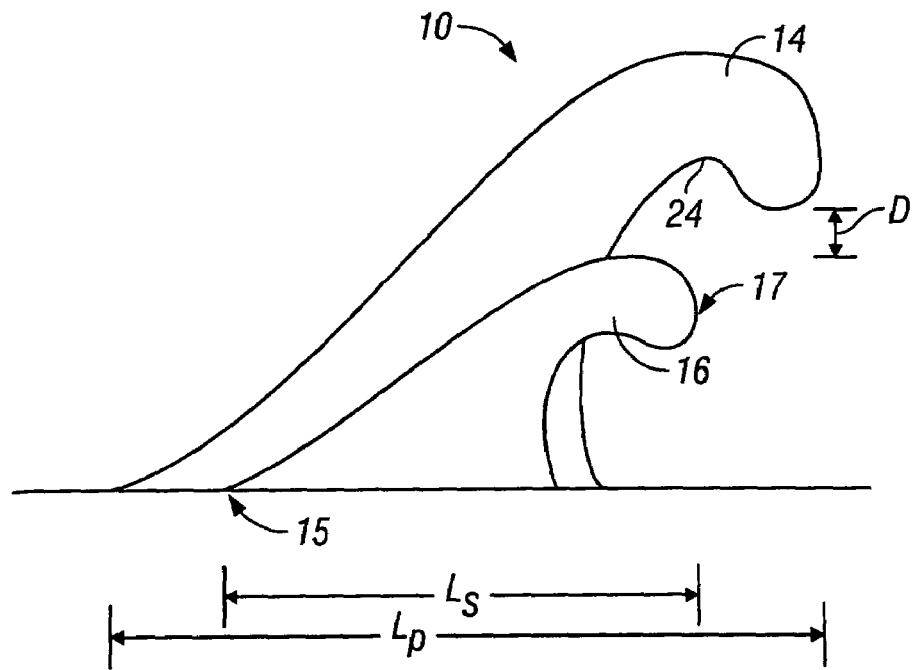
FIG. 1C is a side view of the male fastener element of FIGS. 1–1B.

As shown in FIG. 1C, the distance D between the lowest part of the distal end of primary engagement hook 14 and the highest part of secondary engagement structure 16 is wide enough to receive, e.g., an engageable fiber of a mated loop material. Distance D is between about 0.001 inch and about 0.247 inch, e.g., between about 0.001 inch and about 0.010 inch.

Referring back to FIG. 1B, primary engagement hook 14 preferably has a thickness $T_P$ of between about 0.001 inch and about 0.050 inch, while secondary engagement structure 16 preferably has a thickness $T_S$ of between about 0.001 inch and about 0.050 inch. The secondary engagement structure may have the same thickness as the primary engagement hook, or the engagement structure and the hook may have different thicknesses. The thickness of the secondary engagement structure can be between about 2% and about 5000% the thickness of the primary engagement hook (e.g., between about 15% and about 800% the thickness of the primary engagement hook, between about 25% and about 75% the thickness of the primary engagement hook).

Referring back to FIG. 1, the primary engagement hook and the secondary engagement structure both have base widths that are defined as the widths of their stem portions taken parallel to base sheet 12 at the level where the stem portions join the base sheet. In other words, primary engagement hook 14 has a base width $B_P$ that preferably is between about 0.005 inch and about 0.100 inch. Secondary engagement structure 16 has a base width $B_S$ that preferably is between about 0.005 inch and about 0.100 inch. In some embodiments, $B_S=B_P$.

Male fastener element 10 is preferably made of polymers such as thermoplastic materials, including polyurethanes, polyolefins (e.g., polypropylene, polyethylene), polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers.

Figure 1D:
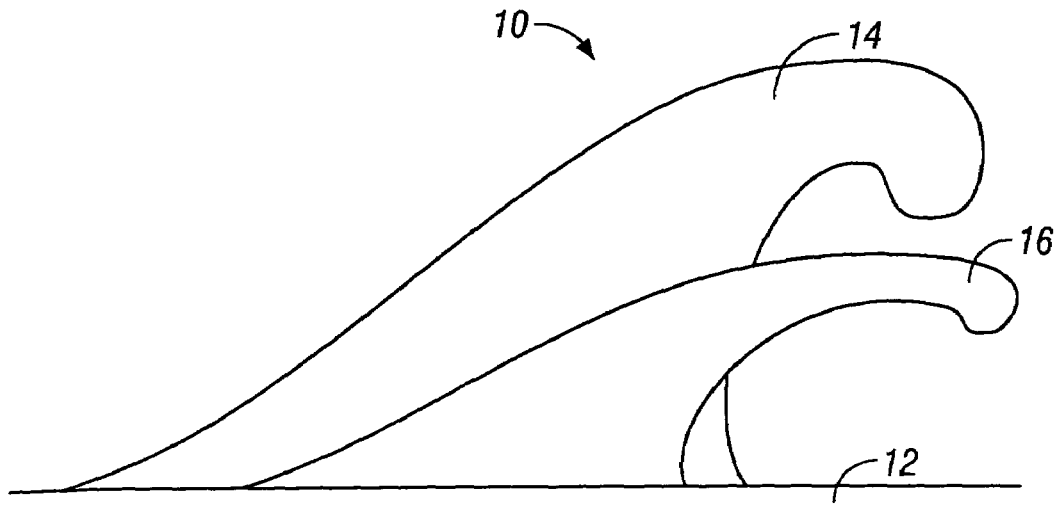
FIG. 1D is a side view of a second embodiment of a male fastener element.

FIG. 1C shows a male fastener element 10 with a secondary engagement structure 16 that appears to extend, in side view, entirely beneath the underside surface 24 of primary engagement hook 14. In other words, in FIG. 1C, the secondary engagement structure does not appear to extend, in side view, beyond underside surface 24. However, as FIG. 1D shows, in some embodiments the secondary engagement structure 16 may appear to extend, in side view, beyond the underside surface 24 of primary engagement hook 14. In FIG. 1D, the secondary engagement structure also is shorter than the primary engagement hook in a direction that is perpendicular to the base. Other embodiments of a male fastener element, shown below, may also have this alternative structure, i.e. with the secondary engagement structure appearing to extend beyond the underside surface of the primary engagement structure in side view.

Figure 2:
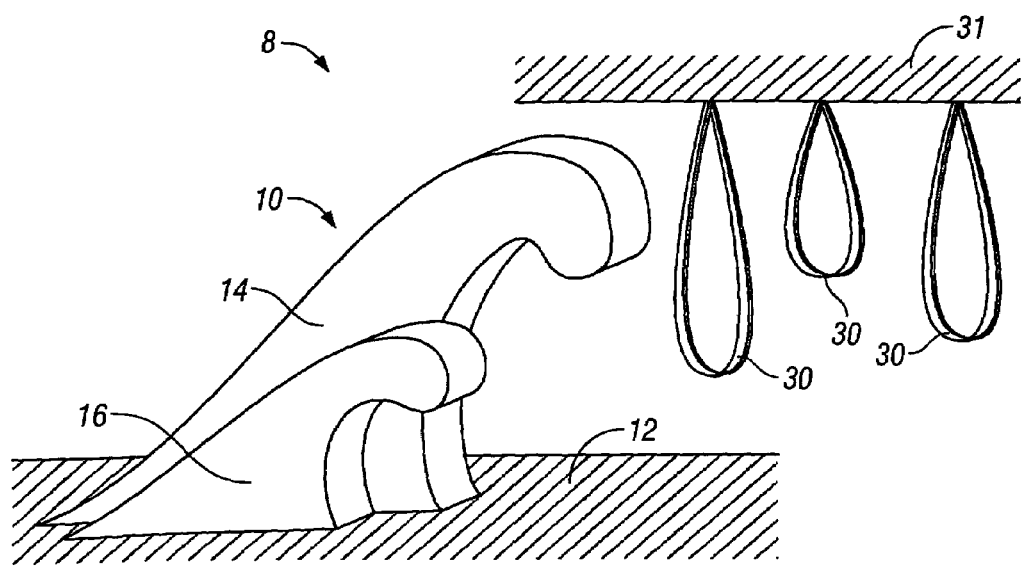
FIGS. 2–2B diagrammatic perspective views that illustrate the engagement of the male fastener element of FIGS. 1–1C with loops.
Figure 2A:
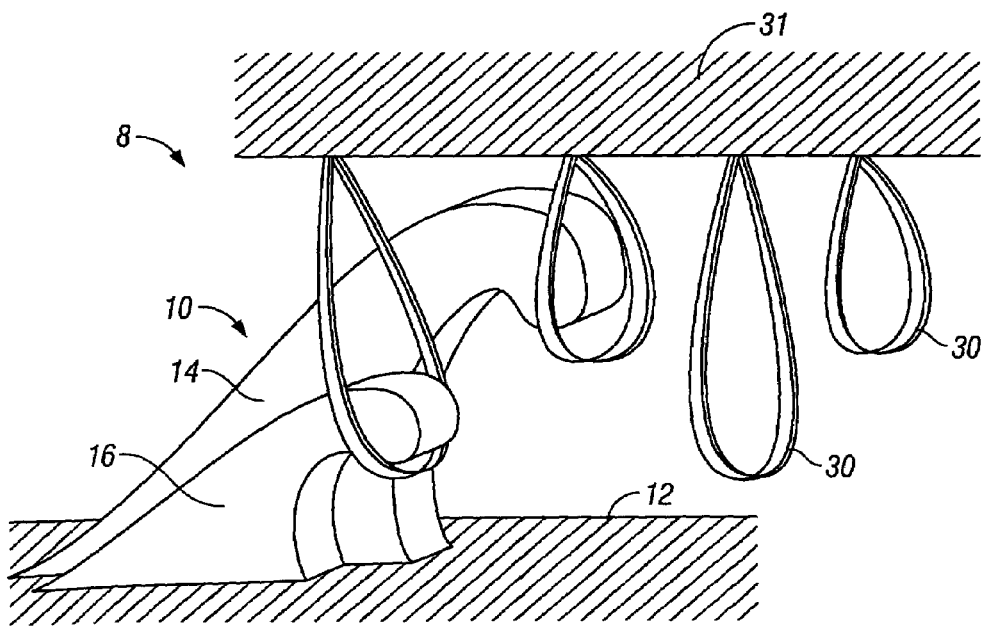
Figure 2B:
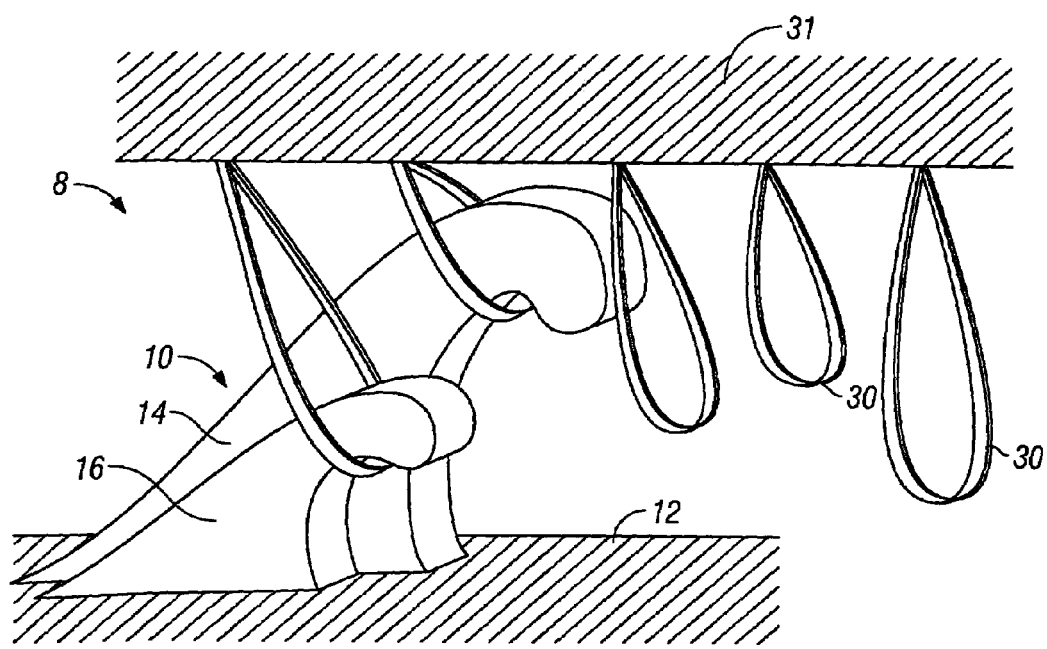

Referring now to FIGS. 2–2B, male fastener component 8 includes a male fastener element 10, constructed to engage loops 30 of a female fastener component 31. (In FIGS. 2–2B, only one male fastener element 10 is shown; however, in practice, male fastener component 8 generally includes an array of male fastener elements 10.) Because male fastener element 10 has two engagement portions of different heights, male fastener element 10 can generally engage loops having a range of different lengths, as shown in FIGS. 2–2B.

Another advantage of male fastener element 10 is that it may have more success in engaging individual loops than would a male fastener element with just one engagement portion. That is, secondary engagement structure 16 may initially engage a loop 30, but then may lose its engagement with the loop. However, primary engagement hook 14 may engage the loop as it is disengaging from the secondary engagement structure. Thus, by having two engagement portions in close proximity to each other, male fastener element 10 may exhibit enhanced engagement of loops as compared to other male fastener elements that lack such a feature.

Alternatively, a loop 30 may engage with both primary engagement hook 14 and secondary engagement structure 16, such that the loop wraps around the whole of male fastener element 10. Thus, if the loop starts to peel away from the male fastener element, the male fastener element's two engagement portions may make it more difficult for the loop to successfully disengage from the male fastener element (as compared to the disengagement of a loop from a male fastener element with just one engagement portion). Additionally, a loop engaged with such a male fastener element may experience enhanced friction when it is pulled in the cross-machine direction, relative to a loop engaged with a male fastener element having just one engagement portion. Furthermore, the male fastener element 10 may be relatively resistant to bending when the engaged loop is pulled in the cross-machine direction.

Figure 3:
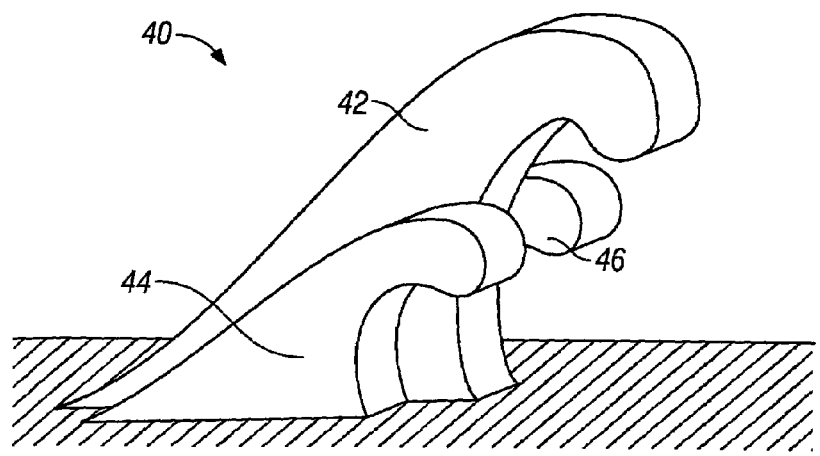
FIG. 3 is a perspective view of a third embodiment of a male fastener element.
Figure 3A:
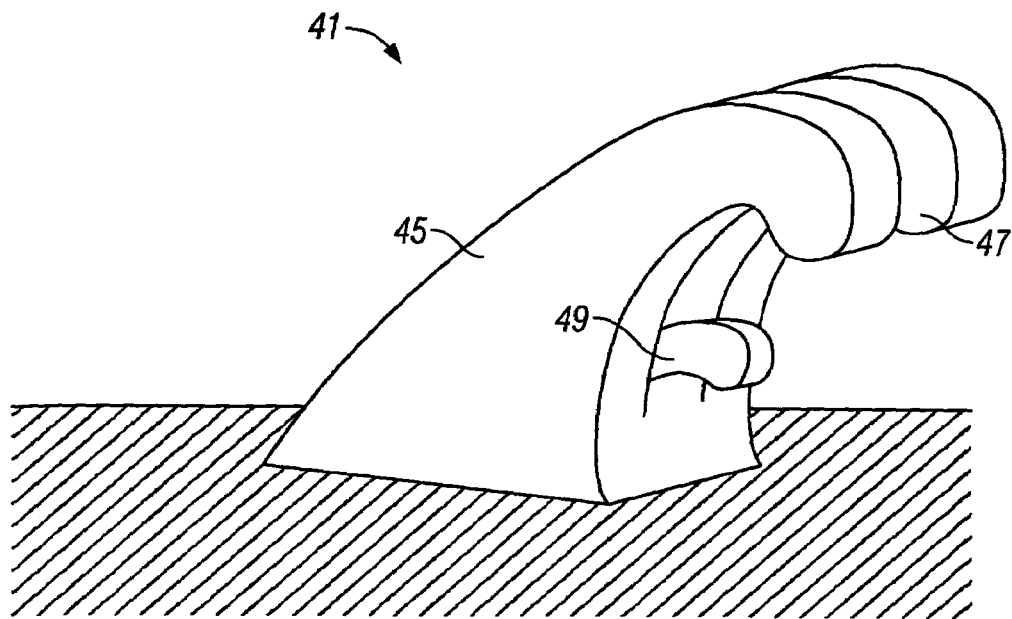
FIG. 3A is a perspective view of a fourth embodiment of a male fastener element.

Referring now to FIG. 3, a male fastener element 40 has a primary engagement hook 42 and two secondary engagement structures, 44 and 46. Male fastener element 40 is similar to male fastener element 10 of FIG. 1, the only significant difference being that fastener element 40 has two secondary engagement structures, while fastener element 10 only has one. In FIG. 3, secondary engagement structures 44 and 46 are shorter than primary engagement hook 42. Alternatively, as shown in FIG. 3A, a male fastener element 41 has two primary engagement hooks, 45 and 47, and a secondary engagement structure 49. Secondary engagement structures 44, 46, and 49 preferably have a height of between about 0.003 inch and about 0.248 inch, and a thickness of between about 0.001 inch and about 0.030 inch. The base width of secondary engagement structures 44, 46, and 49 preferably is between about 0.005 inch and about 0.100 inch. Primary engagement hooks 42, 45, and 47 preferably have a height of between about 0.005 inch and about 0.250 inch, and a thickness of between about 0.001 inch and about 0.030 inch. The base width of primary engagement hooks 42, 45, and 47 preferably is between about 0.005 inch and about 0.100 inch. The secondary engagement structures may have the same size (i.e., height, width, etc.), or alternatively, they may have different sizes. The secondary engagement structures may have the same thickness as the primary engagement hooks, or may be of a different thickness from the primary engagement hooks.

Figure 4:
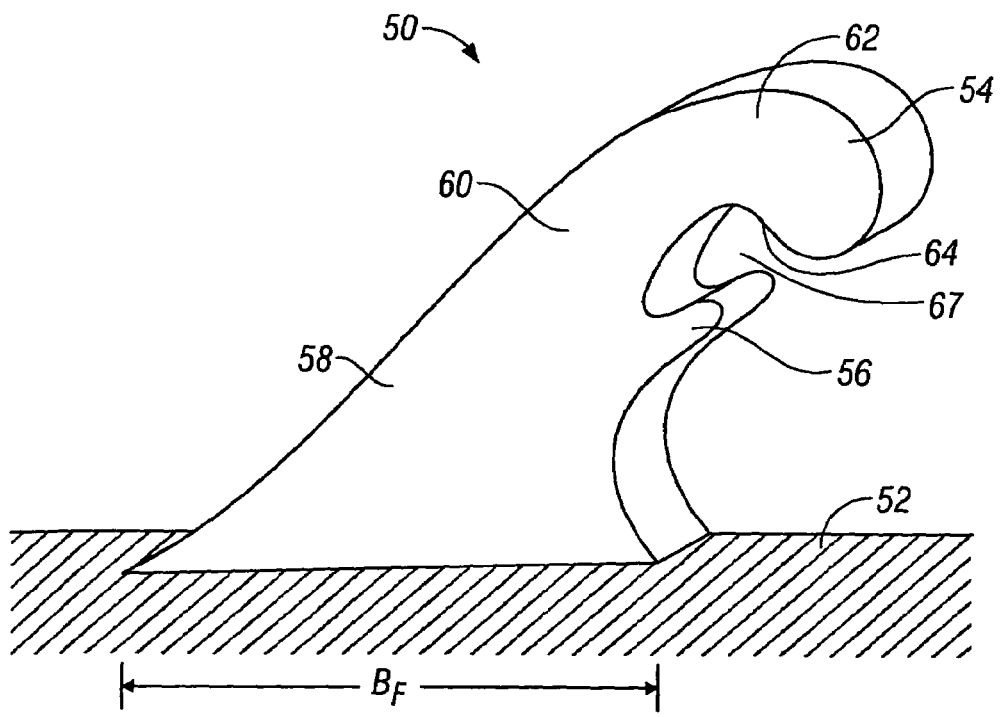
FIG. 4 is a perspective view of a fifth embodiment of a male fastener element.
Figure 4A:
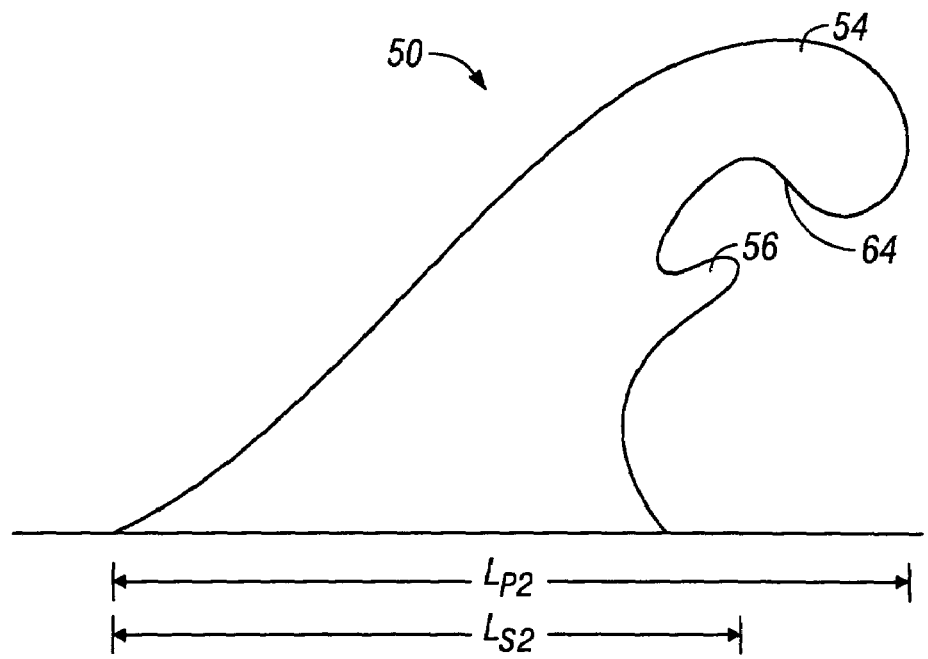
FIG. 4A is a side view of the male fastener element of FIG. 4.

Referring now to FIG. 4, a male fastener element 50 extends integrally from a planar base sheet 52. Male fastener element 50 includes a primary engagement hook 54 and a secondary projection 56. Male fastener element 50 has a tapered stem portion 58 that is integrally molded with planar base sheet 52. Stem portion 58 extends from base sheet 52 to a distal end 60. Primary engagement hook 54 also has a tapered overhang portion 62 that extends from distal end 60 and that has an underside surface 64 overhanging an open volume 67. Overhang portion 62 can receive loops. Secondary projection 56 extends integrally outward from stem portion 58, and, as FIG. 4A shows, has a shorter length ($L_{S2}$) than does primary engagement hook 54 ($L_{P2}$). Secondary projection 56 extends below underside surface 64 of overhang portion 62 of primary engagement hook 54. In FIG. 4A, the secondary projection extends entirely beneath the underside surface of the primary engagement hook. However, as noted above, in some embodiments the secondary projection may extend beyond the underside surface of the primary engagement hook.

Figure 4B:
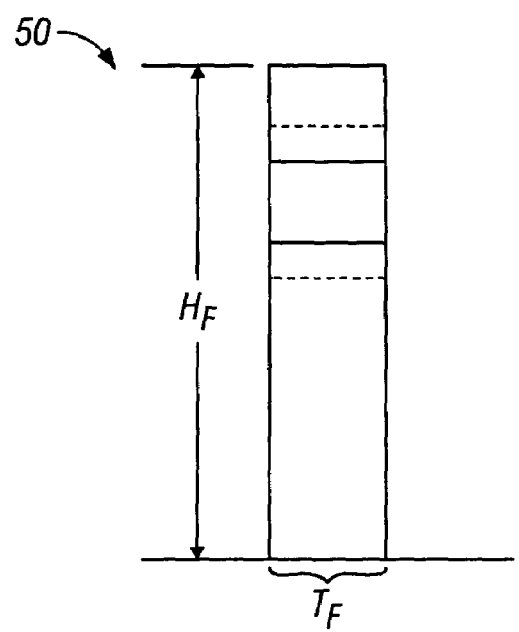
FIG. 4B is a front view of the male fastener element of FIGS. 4 and 4A.

Referring now to FIG. 4B, male fastener element 50 preferably has a height $H_F$ of between about 0.005 inch and about 0.250 inch, and a thickness $T_F$ of between about 0.001 inch and about 0.030 inch. Referring back to FIG. 4, male fastener element 50 preferably has a base width $B_F$ of between about 0.005 inch and about 0.100 inch. Male fastener element 50 preferably is made of polymers such as thermoplastic materials, including polyurethanes, polyolefins (e.g., polypropylene, polyethylene), polystyrenes, polycarbonates, polyesters, polymethacrylate, ethylene vinyl acetate copolymers, ethylene vinyl alcohol copolymers, polyvinylchloride, acrylate modified ethylene vinyl acetate polymers, and ethylene acrylic acid copolymers.

Because male fastener element 50 has two engaging portions, i.e., primary engagement hook 54 and secondary projection 56, male fastener element 50 has enhanced engagement capabilities relative to a fastener element having only one engaging portion. When male fastener element 50 receives a loop, it can receive the loop on either of its two engaging portions. If, for example, fastener element 50 receives a loop on its secondary projection 56, and then the loop slides off, there is still the possibility that primary engagement hook 54 may engage the loop as it is being pulled away. On the other hand, if fastener element 50 receives a loop on its primary engagement portion, then the loop is protected somewhat from disengagement by being loosely "locked" into the space between the primary engagement hook and the secondary projection. Thus, fastener element 50 may exhibit better binding than a fastener element with only one engaging portion. Furthermore, male fastener element 50 may be better protected against shear in the cross-machine direction, relative to a male fastener element having only one engagement portion. Because male fastener element 50 has two engagement portions, it allows for more opportunity for friction between it and the engaged loop.

The secondary projection 56 of male fastener element 50 may take any one of a number of different shapes. For example, the secondary projection may protrude straight out from stem portion 58. It may slant in an upward direction or in a downward direction. The secondary projection may be a hook, and may curve generally upward or generally downward. The shape of the secondary projection may depend on its desired properties.

Figure 5:
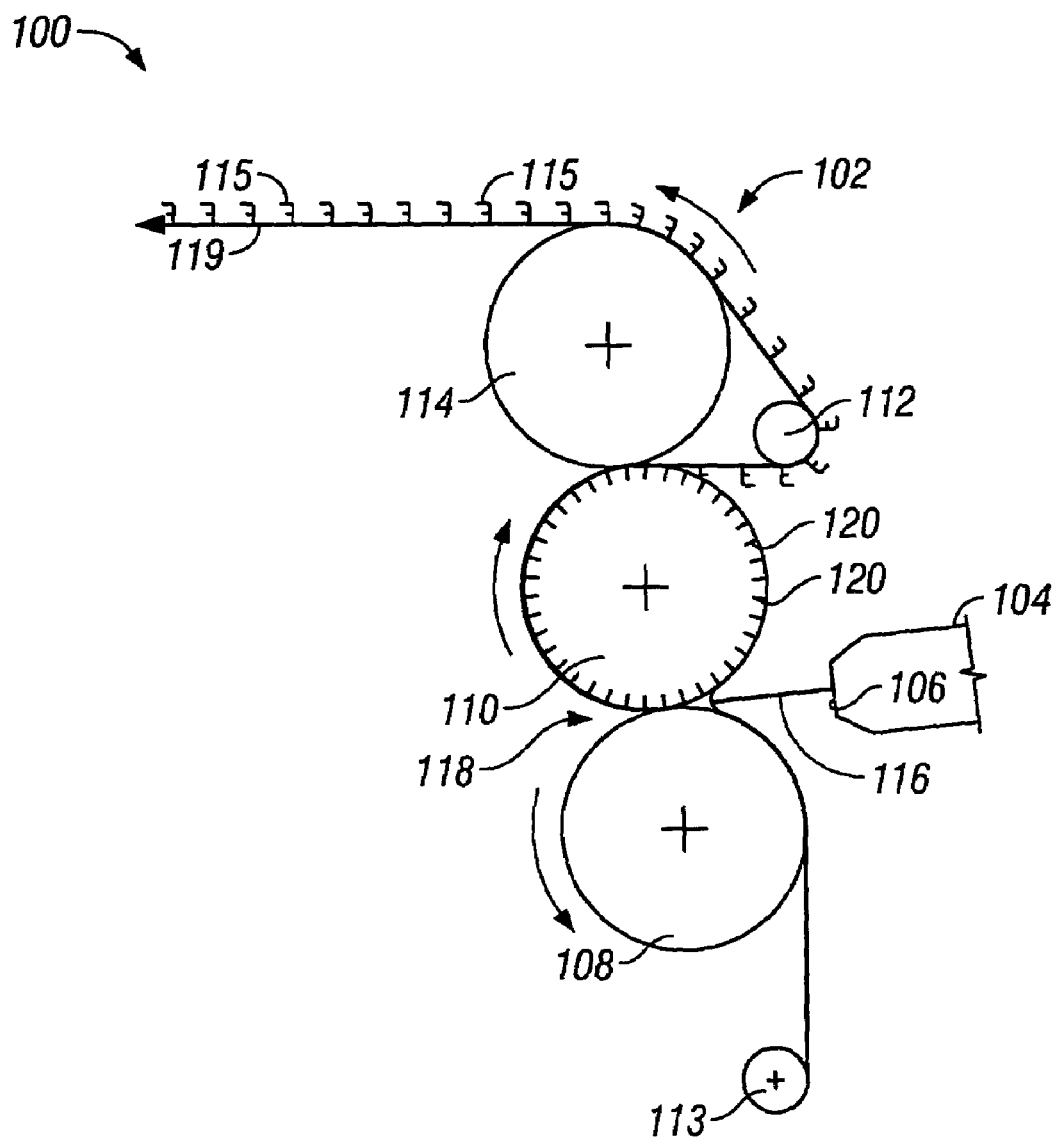
FIG. 5 is a schematic representation of a manufacturing process used to make male fastener elements.

FIG. 5 shows a process for making the above male fastener elements using an extrusion apparatus 100. Suitable processes are described, e.g., in Fischer, U.S. Pat. No. 4,794,028. Extrusion apparatus 100 includes a molding/calendaring assembly 102, which further includes an extruder barrel 104, a slot-form die 106, a base roll 108, a mold roll 110, a take-off roll 112, and a guide roll 114. Using a continuous process, molten resin is extruded and applied with pressure against the cooled mold roll 110, which has mold cavities about its periphery that are configured to produce fastener elements 115. A suitable mold roll 110 is described below, with reference to FIG. 5A.

In use, extruder barrel 104 melts a plastic resin and forces the molten plastic through slot-form die 106, to form a sheet-form extrudate of molten plastic 116. The extruded plastic 116, while still molten, enters a nip 118 formed between base roll 108 and mold roll 110. As described in U.S. Pat. No. 4,794,028, due to pressure applied at the nip by rolls 108 and 110, molten resin is forced into cavities 120, forming the fastener elements 115. The molded fastener elements are on a sheet-form base 119.

In some cases, roll 113 may be used for, e.g., laminating a substrate to the sheet-form base as the sheet-form base is being made. For example, preformed material, woven material, stretchable fabric, or film can be laminated onto the sheet-form base. A suitable lamination process is described in U.S. Pat. No. 6,174,476 (Kennedy et al.), the entire contents of which are herein incorporated by reference. In some cases, a loop material may be laminated onto the base, as described in U.S. Ser. No. 09/808,395, published on Feb. 21, 2002 as U.S. Pat. Application Publication No. U.S. 2002/0022108 A1, the entire contents of which are herein incorporated by reference.

Figure 5A:
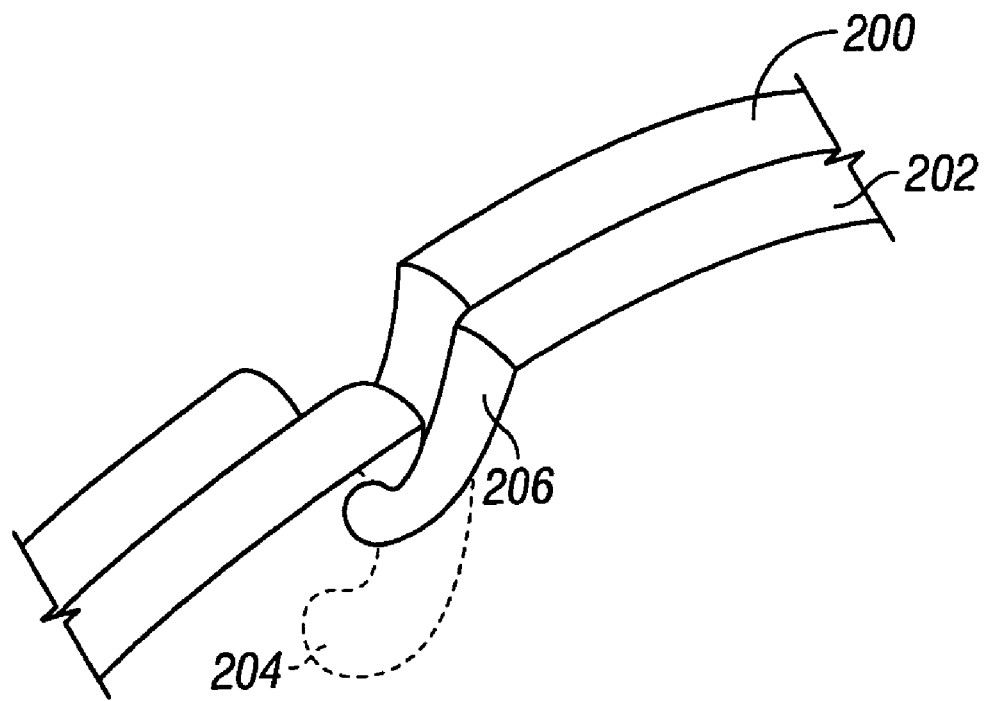
FIG. 5A is an enlarged partial perspective view of one embodiment of a mold plate used in the process of FIG. 5.
Figure 5B:
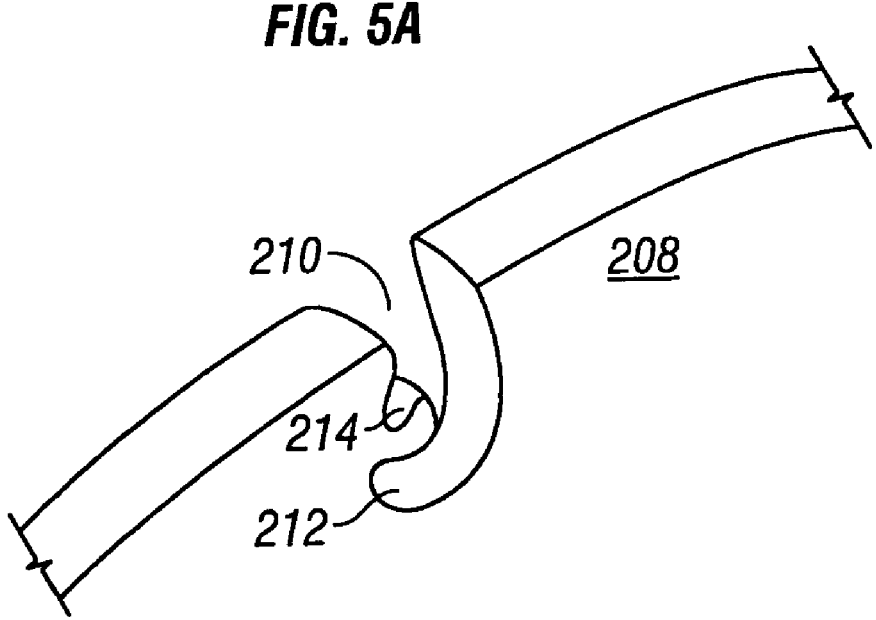
FIG. 5B is an enlarged partial perspective view of a second embodiment of a mold plate used in the process of FIG. 5.

Referring now to FIGS. 5A and 5B, mold plates used in the above extrusion apparatus have different configurations, depending on the desired shape of the fastener element to be formed. For example, referring to FIG. 5A, mold plates 200 and 202 can be used together to form male fastener element 10 of FIG. 1. Mold plate 200 defines a cavity 204 (in part shown by phantom lines) in which primary engagement hook 14 can be formed when molten resin enters the cavity. Mold plate 202 defines a cavity 206 in which secondary engagement structure 16 can be formed when molten resin enters the cavity. When used in extrusion apparatus 100, mold plates 200 and 202 are placed immediately adjacent each other so that the primary engagement hook and secondary engagement structure will be integrally molded adjacent to each other, thereby forming male fastener element 10.

To form fastener elements in which the primary engagement structure is not immediately adjacent to the secondary engagement structure, a spacer plate can be inserted between the mold plates during processing.

Referring now to FIG. 5B, a mold plate 208 is shown that can be used to make male fastener element 50 of FIG. 4. Mold plate 208 defines a cavity 210 having a deeper and broader portion 212 for forming the primary engagement hook 54 of male fastener element 50, and a shallower and smaller portion 214 for forming the secondary projection 56 of male fastener element 50.

Figure 6:
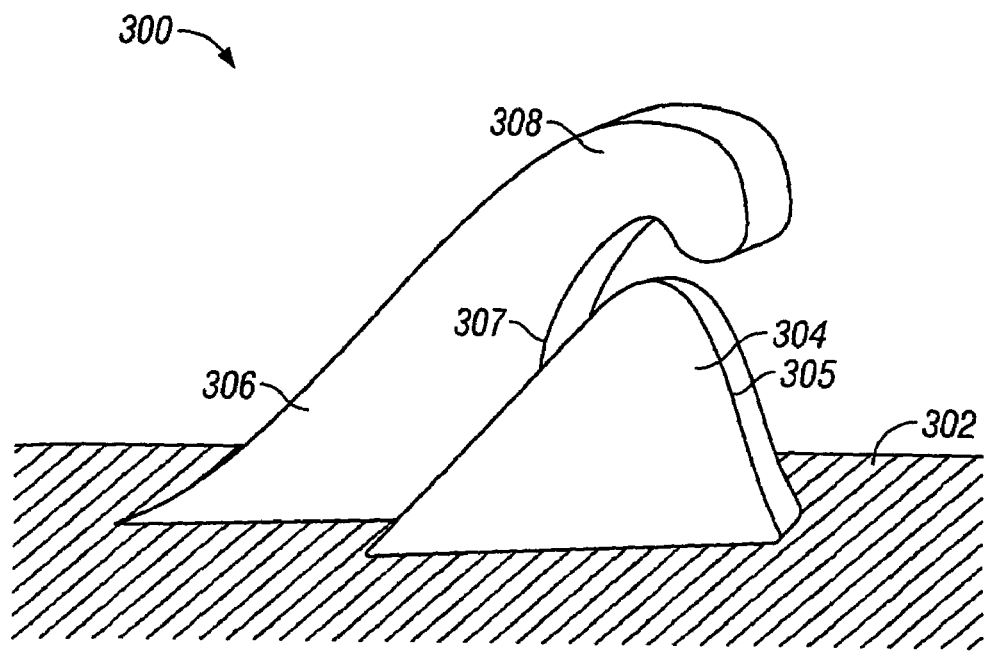
FIGS. 6–6C are perspective views of different embodiments of a male fastener element.

Referring now to FIG. 6, a male fastener element 300 extends integrally from a planar base sheet 302. Male fastener element 300 is similar to male fastener element 10 of FIG. 1, with the exception that the secondary engagement structure 304 of fastener element 300 is a diverter (here, a wedge-shaped diverter). By "diverter," we mean to say a structure that diverts loops from loop-engageable material toward possible engagement with a male fastener element.

Figure 6A:
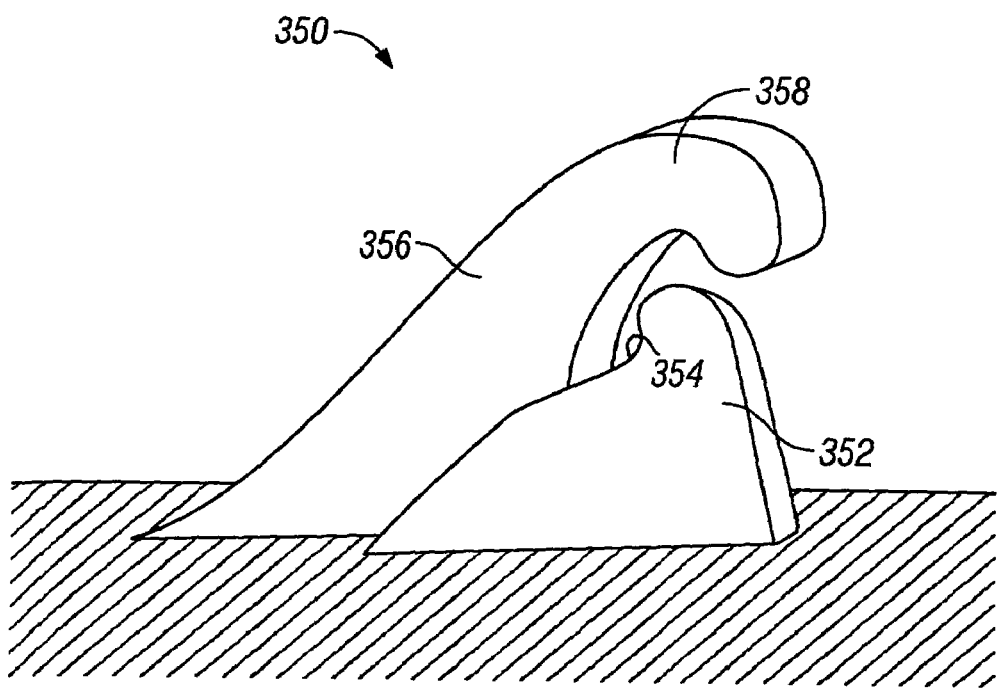
Figure 6B:
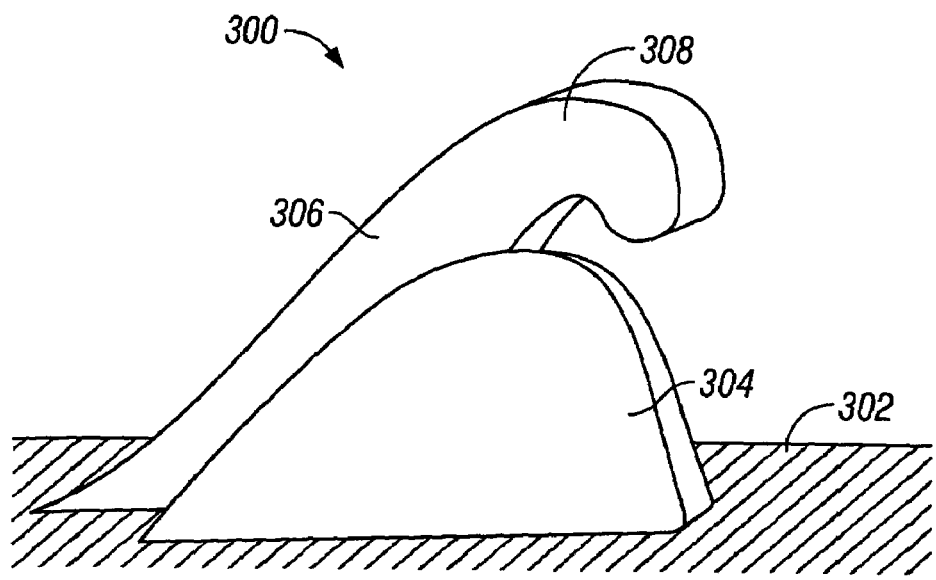

As with fastener element 10, secondary engagement structure 304 of fastener element 300 is integrally molded to a side 306 of a primary engagement hook 308. Secondary engagement structure 304 may assist the primary engagement hook in engaging a loop by further opening the loop, for example, or by temporarily trapping the loop until the loop slides up a side of the secondary engagement structure and is engaged by the primary engagement hook. In some cases, as shown in FIG. 6B, secondary engagement structure 304 may be adjacent to a greater portion of side 306 than it is in FIG. 6. Such an embodiment of male fastener element 300 may exhibit even more strength and resistance to bending in the cross-machine direction than, for example, the embodiment shown in FIG. 6.

While the secondary engagement structure of male fastener element 300 can be wedge-shaped, it can also be in the shape of a wedge with a notched side. Referring now to FIG. 6A, a male fastener element 350 includes a wedge-shaped secondary engagement structure 352 with a notched side 354. The secondary engagement structure 352 is integrally molded to a side 356 of a primary engagement hook 358.

Figure 7:
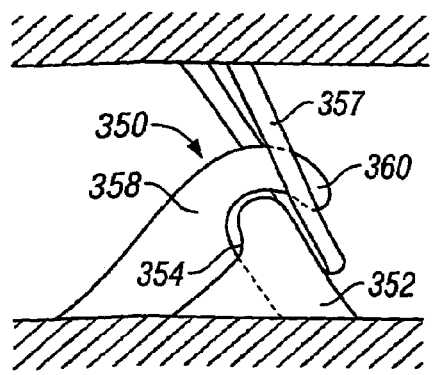
FIGS. 7–7D illustrate the engagement of the male fastener element of FIG. 6A with loops.
Figure 7A:
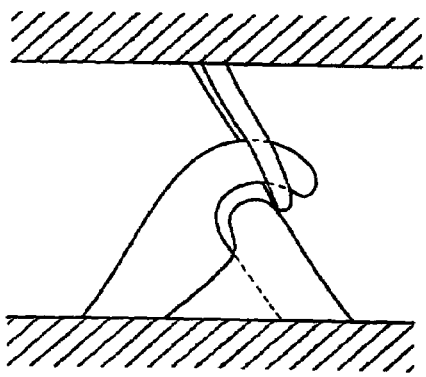
Figure 7B:
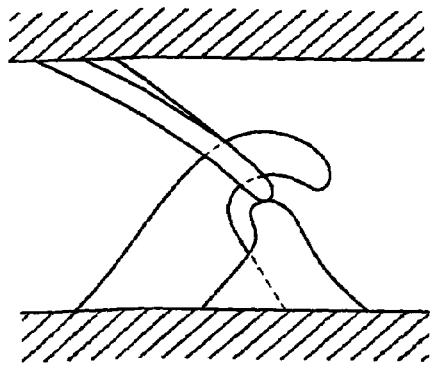
Figure 7C:
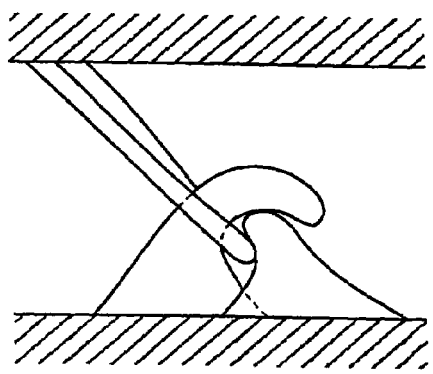
Figure 7D:
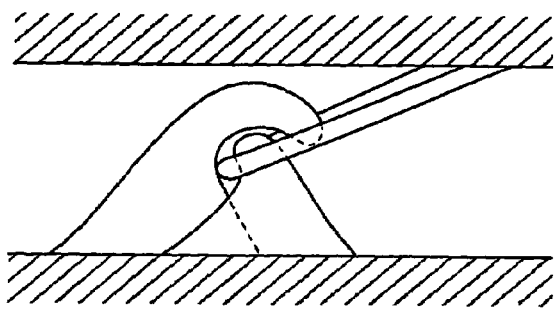

The notched side can lead to even better loop engagement success. Referring now to FIGS. 7–7D, male fastener element 350 engages a loop 257. In FIGS. 7 and 7A, loop 257 slides by primary engagement hook 358, such that it begins to slide over the crook 360 of hook 358. In FIGS. 7B and 7C, the primary engagement hook has engaged the loop. In FIG. 7D, as the loop is pulled in the opposite direction, it has disengaged from the primary engagement hook. However, the loop is prevented from disengaging from male fastener element 350 altogether because the notched side 354 of the secondary engagement structure 352 has trapped the loop once again. Thus, the notched side decreases the likelihood of loop disengagement by essentially giving the male fastener element a "second chance" to reengage a loop once it has started to disengage. Furthermore, in some embodiments the wedge can add support to the primary engagement hook in the cross-machine direction.

Figure 6C:
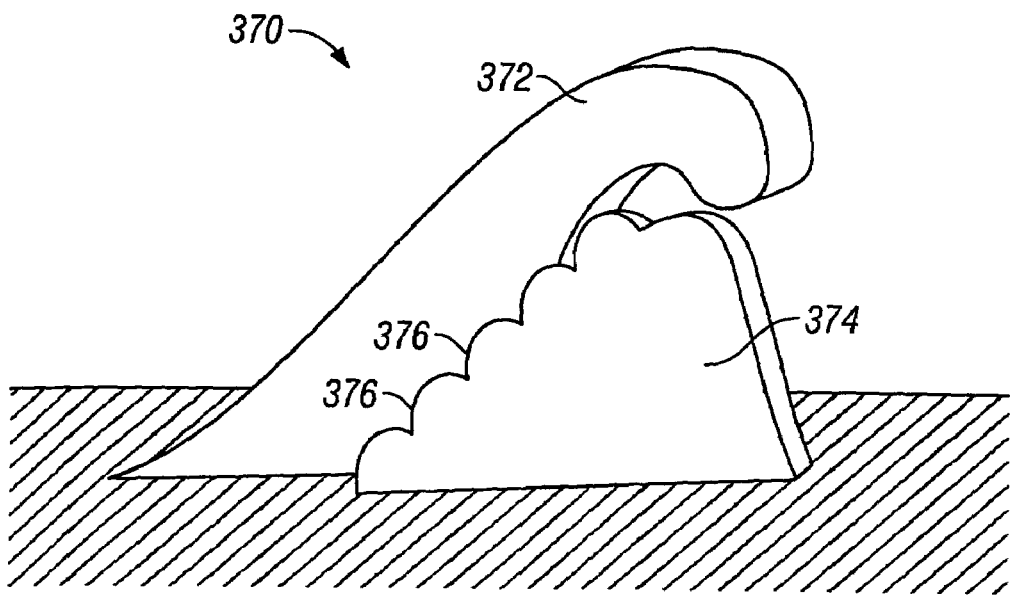

In some cases, as shown in FIG. 6C, a male fastener element 370 includes a primary engagement hook 372 and a wedge-shaped diverter 374 with a knob or knobs 376 on its side. The knobs create added friction for a loop in contact with diverter 374, and give male fastener element 370 good engagement capability.

Figure 11:
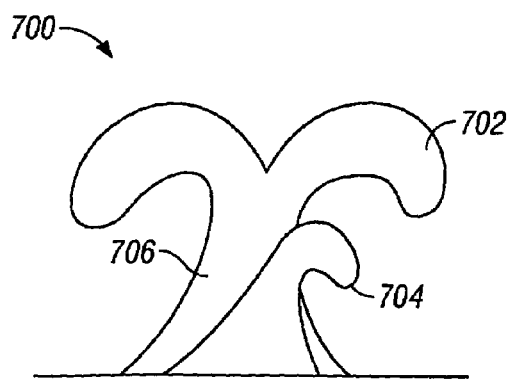
FIGS. 11 and 11A are side views of embodiments of a male fastener element.
Figure 11A:
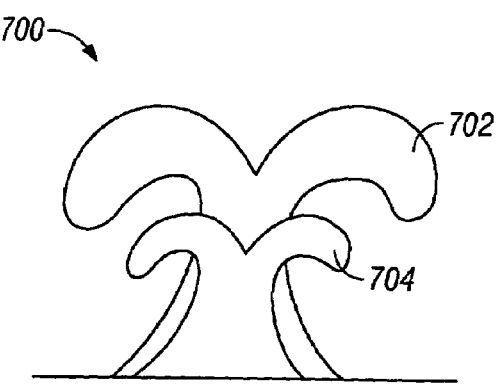

FIG. 11 shows a male fastener element 700 that includes a primary engagement palm tree hook 702, and a secondary engagement structure 704 (here, a hook). The secondary engagement structure 704 is integrally molded to a side 706 of a primary engagement palm tree hook 702. As shown in FIG. 11A, in some embodiments, the secondary engagement structure 704 may be a palm tree hook, as well.

Referring now to FIGS. 8–8G, male fastener element 10 has many different possible embodiments. In different embodiments, the secondary engagement structures can be oriented at different angles and can have different shapes. The secondary engagement structure 16 of male fastener element 10 can project horizontally outward, for example, as shown in FIG. 8. Alternatively, structure 16 can project in a diagonal upward direction, as shown in FIG. 8A. In FIG. 8B, structure 16 points upward, but curves slightly at its distal end. FIG. 8C shows a structure 16 pointing in an upward direction, and becoming relatively narrow at its distal end. In other embodiments, structure 16 can be in the shape of a hook, as in FIG. 8D. In FIG. 8E, the secondary engagement structure 16 points in a steep upward direction, and is narrower at its base than it is in some of the other embodiments. In FIG. 8F, secondary engagement structure 16 is in the shape of a hook, and is adjacent to a relatively large portion of the side of primary engagement hook 14. Finally, in FIG. 8G, secondary engagement structure 16 curves upward in a short hook.

The above embodiments can have various advantages relative to a similar male fastener element with only one engagement structure. For example, the above embodiments can have some or all of the following advantages: increased opportunity to engage more loops of varying lengths, increased cross-machine direction shear, increased machine direction peel, enhanced cross-machine direction peel, increased opportunity to lock in loops under the primary engagement hook, and increased stiffness of the primary engagement hook in the cross-machine direction. Moreover, any of the embodiments shown and discussed above can include a re-entrant hook geometry, which will tend to enhance engagement with loops.

Figure 9:
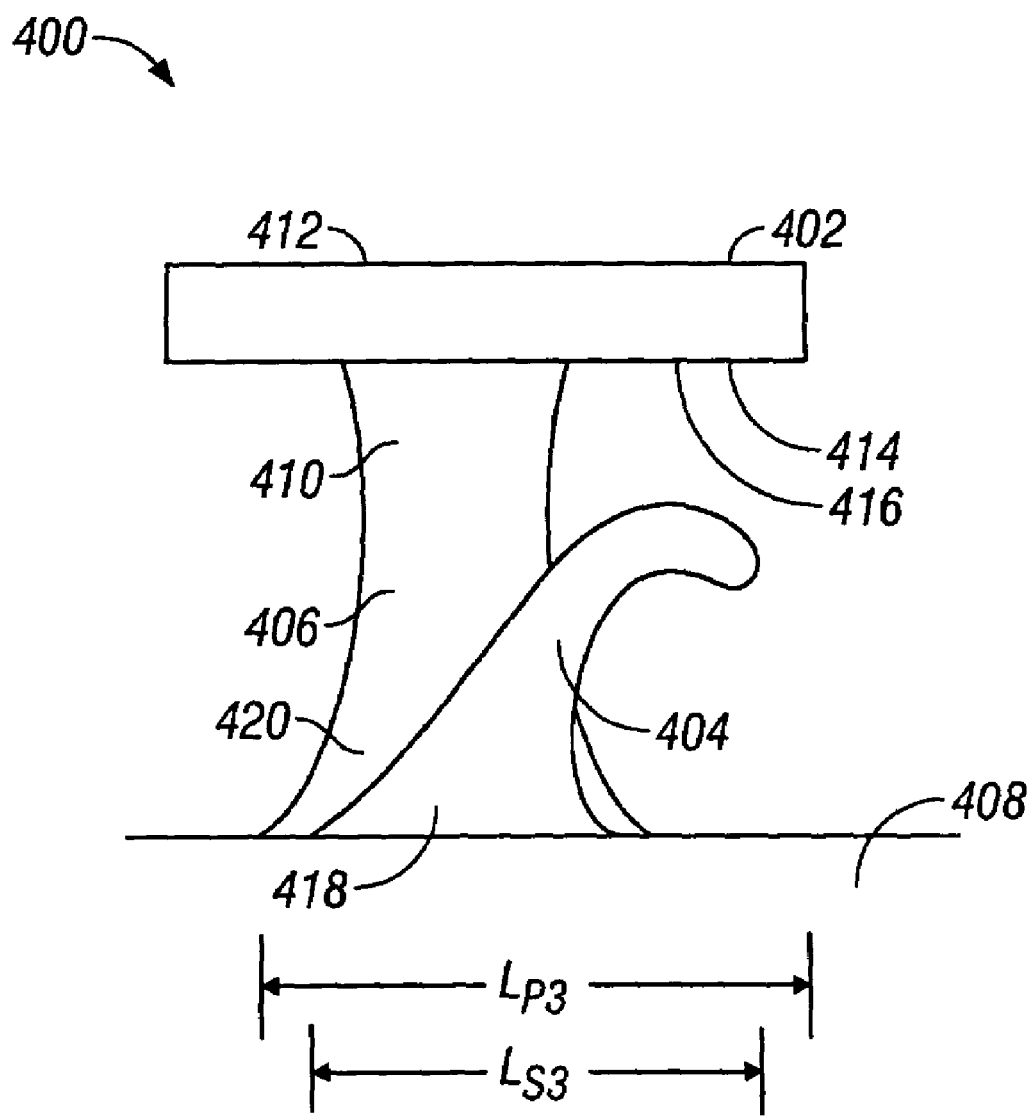
FIG. 9 is a side view of one embodiment of a male fastener element.

Referring now to FIG. 9, a male fastener element 400 includes a flat-topped mushroom 402 and a secondary engagement structure 404, both of which are configured to receive loops. Mushroom 402 has a stem portion 406 that is integrally molded with a planar base sheet 408. Stem portion 406 extends from sheet 408 to a distal end 410. Mushroom 402 also has a generally disc-shaped head 412 that extends from distal end 410 and overhangs base sheet 408. A portion of head 412 has an underside surface 414 overhanging an open volume 416.

Secondary engagement structure 404 extends integrally from planar base sheet 408, as well, and has a stem portion 418. The secondary engagement structure is located immediately adjacent mushroom 402, extending from a side surface 420 of the primary engagement mushroom. However, for some applications, the secondary engagement structure and the primary engagement structure are not immediately adjacent, but are separated by a space of between about 0.0005 inch and about 0.004 inch. Such separation can be provided, for example, by placing a spacer ring between the mold rings that are used to form male fastener element 400. Secondary engagement structure 404 is shorter than mushroom 402. Additionally, secondary engagement structure 404 has a shorter length ($L_{S3}$) than does mushroom 402 ($L_{P3}$). Thus, when male fastener element 400 is viewed from the side, the secondary engagement structure 404 extends below the underside surface 414 of the head 412. In some embodiments, the secondary engagement structure extends beyond the primary engagement structure.

Male fastener element 400 exhibits good engagement capacity. Additionally, the flat-topped mushroom 402 of male fastener element 400 may be softer to the touch than a regular hook of comparable size. Thus, male fastener element 400 is well-suited for applications in which it is desirable to have enhanced loop-engaging capacity in combination with relatively soft engagement material. Male fastener element 400 is also well-suited for skin-friendly applications. While FIG. 9 shows a flat-topped mushroom, male fastener element 400 can, in some embodiments, include, e.g., a flat-topped hook or a flat-topped stem instead.

Figure 10:
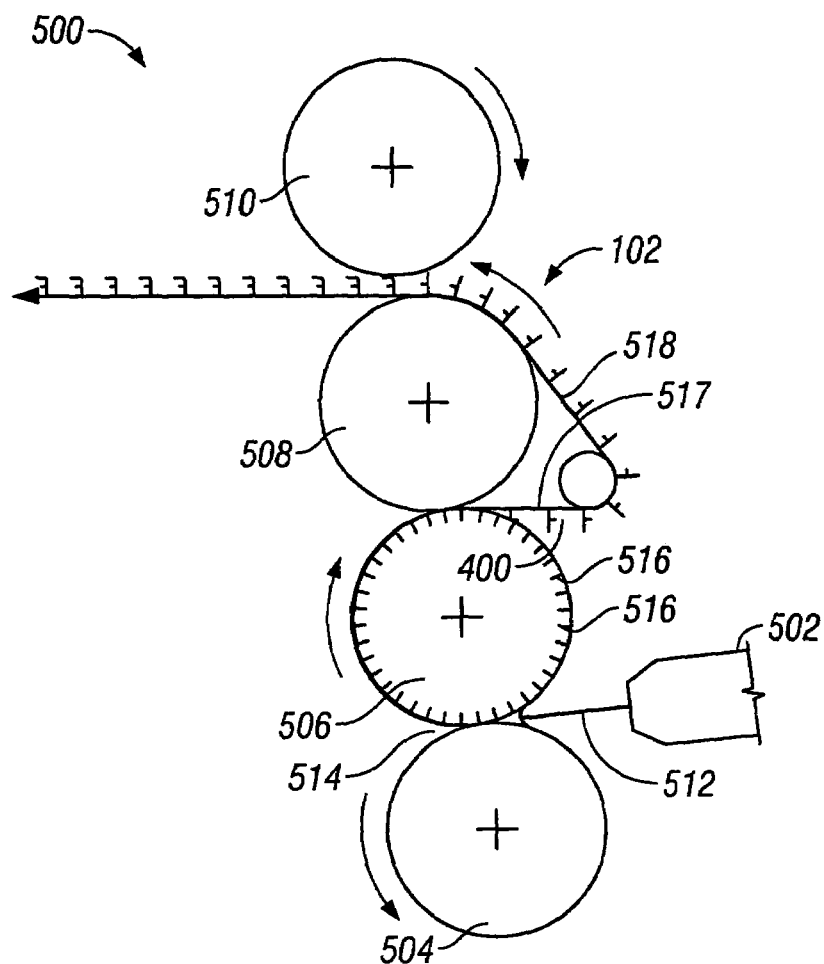
FIG. 10 is a schematic representation of a process used to make the male fastener element of FIG. 9.

Referring now to FIG. 10, a mold-roll apparatus 500 can be used to make male fastener element 400. Apparatus 500 includes an extruder 502, a pressure roll 504, a mold roll 506, a wrap-around roller 508, and a knock-down roller 510. To make male fastener elements, molten resin 512 from extruder 502 is continuously extruded into a nip 514 formed between cooled mold roll 506 and pressure roll 504. Under the pressure of the nip, molten resin is forced into mold cavities 516 and also between the rolls, to form a sheet-form base 517 that is integral with the molded fastener formations 400. Thereafter, the molded tape 518 is passed between wrap-around roller 508 and knock-down roller 510 while the fastener elements are still soft and permanently deformable. Roller 510 pushes any higher elements down to a uniform, desired pre-established height. During this process, therefore, the flat-topped mushrooms may be formed from a molded element (see further discussion below, with reference to FIG. 10B). In other instances, the knock-down roller 510 is heated to a level sufficient to enable it to reform, by thermoforming, the engaged portion of the molded elements to provide further characteristics to the end product.

A method for flat-topping mushrooms is disclosed in U.S. Pat. No. 6,248,276 (Parellada et al.), the entire contents of which are herein incorporated by reference. A method for flat-topping stems or hooks is described in U.S. Pat. No. 5,953,797 (Provost et al.), the entire contents of which are herein incorporated by reference.

Figure 10A:
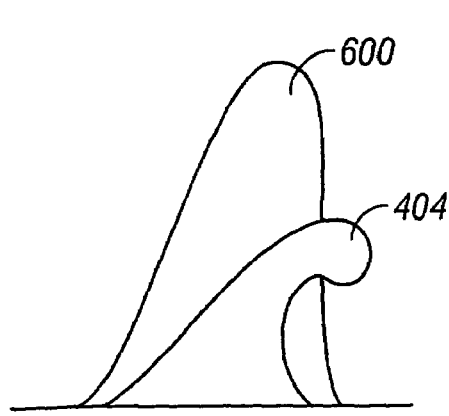
FIGS. 10A and 10B are a schematic representation of the formation of the male fastener element of FIG. 9 by the process shown in FIG. 10.
Figure 10B:
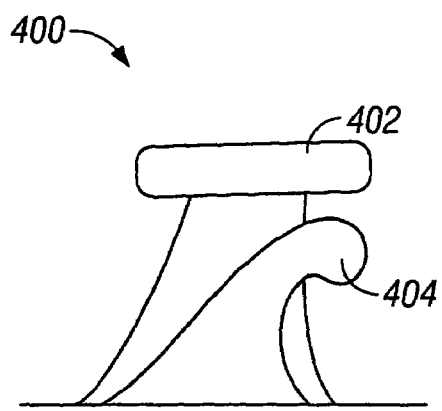

Referring now to FIGS. 10A and 10B, male fastener element 400 is created by a deformation process under the knock-down roller 510 discussed with reference to FIG. 10. In FIG. 10A, a molded structure 600 and secondary engagement structure 404 have been molded according to the process generally described with reference to FIG. 5. The structures 600 and 404 have yet to come into contact with the force of knock-down roller 510. In FIG. 10B, however, the knock-down roller has come into contact with molded structure 600, deforming the top of the molded structure and forming male fastener element 400.

Figure 12:
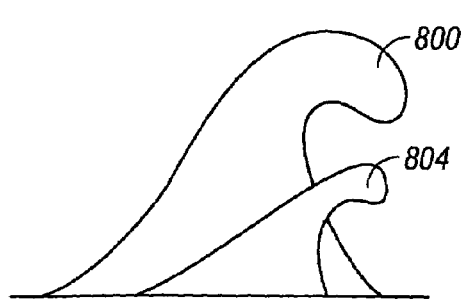
FIGS. 12 and 12A are a schematic representation of the formation of a male fastener element.
Figure 12A:
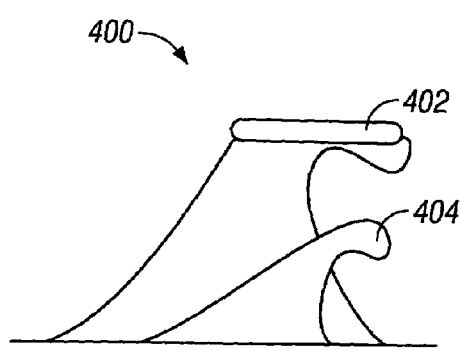

As discussed above with reference to FIG. 9, some embodiments of male fastener element 400 may include flat-topped hooks. Referring now to FIGS. 12 and 12A, such a male fastener element 400 is created by a deformation process under the knock-down roller 510 discussed with reference to FIG. 10. In FIG. 12, a J-hook 800 and secondary engagement structure 804 have been molded according to the process generally described with reference to FIG. 5. The structures 800 and 804 have yet to come into contact with knock-down roller 510. In FIG. 12A, however, the knock-down roller has come into contact with molded structure 800, deforming the top of the structure to form male fastener element 400.

Further embodiments are within the following claims.

What is claimed is:

1. A male fastener element extending integrally from a planar base, the fastener element comprising:
   a molded, tapered primary stem extending integrally from the planar base to a distal end;
   a secondary engagement structure comprising
      a tapered stem portion integrally molded with the tapered primary stem and extending from the planar base to a distal end, and
      a tapered overhang portion extending from the distal end of the stem portion and having a first underside surface overhanging a first open volume for receiving loops; and
   a second overhang portion disposed at the distal end of the primary stem and having a second underside surface overhanging a second open volume for engaging loops, the second overhang portion extending, in side view, above the overhang portion of the secondary engagement structure,
   the overhang portions of the secondary engagement structure and the primary stem together overhanging at most a single, contiguous area of the base.

2. The male fastener element of claim 1, wherein the primary stem has a height of between about 0.005 inch and about 0.250 inch.

3. The male fastener element of claim 1, wherein the secondary engagement structure has a height of between about 0.003 inch and about 0.248 inch.

4. The male fastener element of claim 1, wherein the secondary engagement structure has a height that is between about 1% and about 99% the height of the primary stem.

5. The male fastener element of claim 4, wherein the secondary engagement structure has a height that is between about 20% and about 80% the height of the primary stem.

6. The male fastener element of claim 1, wherein the primary stem has a thickness of less than about 0.030 inch.

7. The male fastener element of claim 1, wherein the secondary engagement structure has a thickness of less than about 0.050 inch.

8. The male fastener element of claim 1, wherein the secondary engagement structure has a thickness that is between about 2% and about 5000% the thickness of the primary stem.

9. The male fastener element of claim 8, wherein the secondary engagement structure has a thickness that is between about 15% and about 800% the thickness of the primary stem.

10. The male fastener element of claim 1, wherein a lowest part of the second overhang portion and a highest part of the secondary engagement structure define therebetween a gap of a size selected to receive an engageable fiber of a mated loop material.

11. The male fastener element of claim 10, wherein the distance between the lowest part of the second overhang portion and the highest part of the secondary engagement structure is at least about 0.001 inch.

12. The male fastener element of claim 11, wherein the distance between the lowest part of the second overhang portion and the highest part of the secondary engagement structure is between about 0.001 inch and about 0.248 inch.

* * * * *

UNITED STATES PATENT AND TRADEMARK OFFICE
CERTIFICATE OF CORRECTION

PATENT NO. : 6,996,880 B2  
APPLICATION NO. : 10/404867  
DATED : February 14, 2006  
INVENTOR(S) : Wallace L. Kurtz, Jr. et al.

It is certified that error appears in the above-identified patent and that said Letters Patent is hereby corrected as shown below:

Title Page, item 75 under Inventors:  
Delete "Manchester, NH (US)" and Insert --Bedford, NH (US)--

Title Page, item 57 under Abstract, Line 15:  
Before "surface" insert --underside--

Signed and Sealed this

Twelfth Day of December, 2006

JON W. DUDAS  
*Director of the United States Patent and Trademark Office*